United States Patent [19]
Doi et al.

[11] Patent Number: 4,475,008
[45] Date of Patent: Oct. 2, 1984

[54] COORDINATE INPUT DEVICE WITH PRESSURE-SENSITIVE RUBBER SHEET

[75] Inventors: Miwako Doi, Tokyo; Mitsuo Saito, Yokosuka, both of Japan

[73] Assignee: Tokyo Shibaura Denki Kabushiki Kaisha, Kawasaki, Japan

[21] Appl. No.: 407,950

[22] Filed: Aug. 13, 1982

[30] Foreign Application Priority Data

Aug. 28, 1981 [JP] Japan ............................ 56-135106

[51] Int. Cl.³ ............................................. G08C 21/00
[52] U.S. Cl. ................................................... 178/18
[58] Field of Search ............... 178/18, 19, 20; 338/59

[56] References Cited
U.S. PATENT DOCUMENTS

| | | | |
|---|---|---|---|
| 3,624,619 | 11/1971 | Ambrosio | 340/173 R |
| 3,798,370 | 3/1974 | Hurst | 178/18 |
| 4,079,194 | 3/1978 | Kley | 178/18 |
| 4,220,815 | 9/1980 | Gibson et al. | 178/18 |

FOREIGN PATENT DOCUMENTS

53-149055 12/1978 Japan .
1331942 9/1973 United Kingdom .

OTHER PUBLICATIONS

Patents Abstracts of Japan, vol. 5, No. 48(P-55) (720), Apr. 7, 1981.

*Primary Examiner*—Stafford D. Schreyer
*Attorney, Agent, or Firm*—Oblon, Fisher, Spivak, McClelland & Maier

[57] ABSTRACT

In a coordinate input device which comprises a resistance plate and a pressure-sensitive rubber sheet placed on the resistance plate so that DC voltage is alternately applied to the resistance plates in the X-axis direction and Y-axis direction of the resistance plate, a surface electrode plate is placed on the pressure-sensitive rubber sheet. The surface electrode plate has a soft synthetic resin plate and a metallic electrode layer formed on the surface of the synthetic resin plate, and the metallic electrode layer is so placed on the pressure-sensitive rubber sheet as to contact the pressure-sensitive rubber sheet.

8 Claims, 4 Drawing Figures

COORDINATE INPUT DEVICE WITH PRESSURE-SENSITIVE RUBBER SHEET

BACKGROUND OF THE INVENTION

The present invention relates to a coordinate input device which employs a pressure-sensitive rubber sheet.

A coordinate input device using a resistance plate has recently been utilized to input graphic information, character information, etc. When pressure is applied onto the resistance plate in this conventional coordinate input device, a pressure-sensitive rubber sheet is conducted at the pressure applied point of the resistance plate. DC voltage is applied to the resistance plate in its X-axis and Y-axis directions alternately. When the pressure is applied to the pressure-sensitive rubber sheet by a probe, the coordinate information of the pressure applied point are taken as X-axis and Y-axis voltages through the pressure-sensitive rubber sheet, and the X-axis and Y-axis voltages are converted into digital information to be input to a computer.

In a conventional coordinate input device disclosed in Japanese patent early publication No. 53-149055 laid open on Dec. 26, 1978, a surface electrode plate, e.g., a thin metallic plate or an electrically conductive rubber sheet is placed on the upper surface of a pressure-sensitive rubber sheet, and the voltages at the pressure-applied point are taken from the surface electrode plate. This device can eliminate the necessity of a conductive probe to be connected with a lead wire and enables the coordinate information to be input to a computer with a pencil or a pen.

However, this device still has problems described below. In case where the surface electrode plate is formed of a metallic plate, since the metallic plate is weak for plastic deformation, the metallic plate can hardly restore when pressure is removed from the surface electrode plate. Therefore, the continuous input of coordinate information is difficult. Further, in case where the surface electrode plate is formed of an electrically conductive rubber sheet, it is difficult to obtain accurate coordinate information, since the resistance value of the conductive rubber is relatively large.

SUMMARY OF THE INVENTION

It is an object of the present invention to provide a coordinate input device which does not necessitate an exclusive probe connected with a lead wire and can accurately and simply input coordinate information with a pencil or a pen.

In order to achieve the above object, in a coordinate input device comprising a resistance plate to which DC voltage is applied in its X-axis and Y-axis directions alternately, and a pressure-sensitive rubber sheet placed on the resistance plate there is provided a surface electrode plate which is placed on the pressure-sensitive rubber sheet.

The surface electrode plates includes a soft synthetic resin plate and a metallic electrode layer formed on the synthetic resin plate. Alternatively, a hard synthetic resin plate may be interposed between the soft synthetic resin plate and the metallic electrode layer. The surface electrode plate is so placed on the pressure-sensitive rubber sheet as to allow the metallic electrode layer to contact the pressure-sensitive rubber sheet.

DETAILED DESCRIPTION OF THE PREFERRED EMBODIMENTS

The present invention will now be described in more detail with reference to the accompanying drawings.

Figure 1:
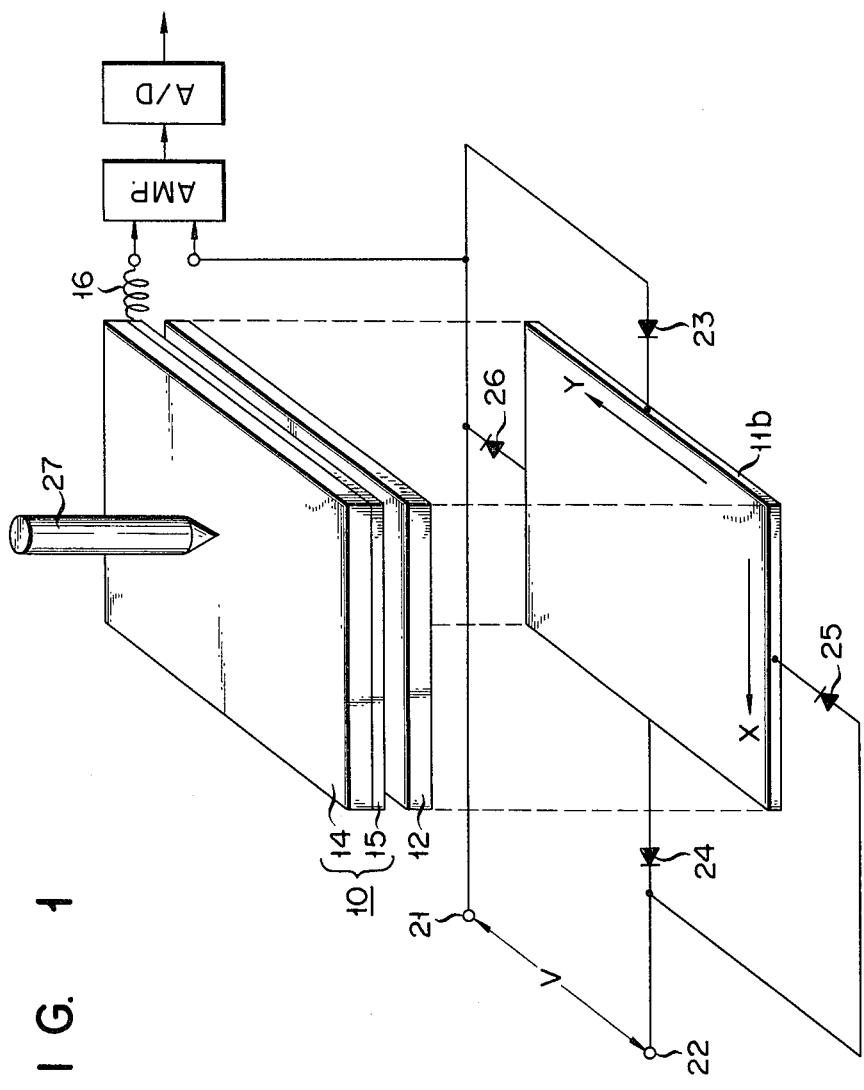
FIG. 1 is a schematic structural perspective view of a coordinate input device according to one embodiment of the present invention.
Figure 2:
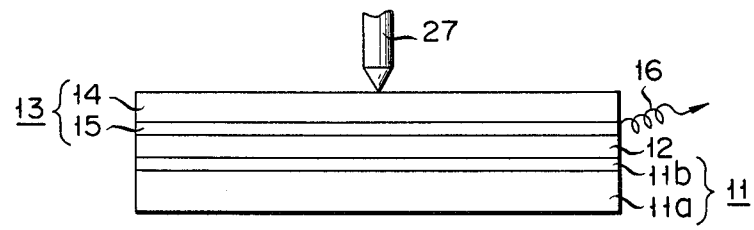
FIG. 2 is a side view of the essential portion of the coordinate input device of the present invention shown in FIG. 1.

FIG. 1 is a schematic structural view of the coordinate input device according to one embodiment of the present invention, and FIG. 2 is a side view of the essential portion of the above input device to which the present invention is directed.

As shown in FIG. 2, a resistance plate 11 is formed by printing or plating a resistance film 11b, e.g., a carbon resistance or metallic oxide resistance on the upper surface of an insulating substrate 11a, e.g., paper phenol resin (as in an ordinary printed circuit board). On resistance film 11b is placed a pressure-sensitive rubber sheet 12 (having a thickness of approx. 0.5 mm) having a property of electrically conducting at the portion to which pressure is applied. Further, on pressure-sensitive rubber sheet 12 is placed a surface electrode plate 13. Surface electrode plate 13 is formed of, for example, a soft synthetic resin plate 14 (having a thickness of approx. 200 microns) made, for example, of soft vinyl chloride resin, polyurethane resin, and a thin metallic layer 15 of, for example, copper, nickel or tin plated on the lower surface of soft synthetic resin plate 14. Surface electrode plate 13 is so placed on rubber sheet 12 as to allow metallic layer 15 to contact pressure-sensitive rubber sheet 12. A lead wire 16 is connected to metallic layer 15.

A DC voltage applied to input terminals 21 and 22 is switched in its polarity to be applied to resistance film 11b in its X-axis direction through diodes 23 and 24 and in its Y-axis direction through diodes 25 and 26. When a probe 27, e.g., a pencil or a pen is used to apply pressure to soft synthetic resin plate 14, voltages at a pressure applied point on resistance film 11b in the X-axis and Y-axis directions are alternately taken through metallic layer 15 and lead wire 16, and are applied through an amplifier 28 to an analog-to-digital converter 29. Digital coordinate information representing the pressure applied point and produced by analog-to-digital converter 29 is supplied to a computer (not shown).

According to the coordinate input device thus constructed, surface electrode plate 13 is, even if deformed by depression due to probe 27, rapidly restored by the action of soft synthetic resin 14. Therefore, metallic layer 15 can sufficiently follow the movement of probe 27. Thus, the coordinate information can be obtained continuously and accurately. Further, the good conductivity of metallic layer 15 ensures that accurate coordinate information can be obtained.

Figure 3:
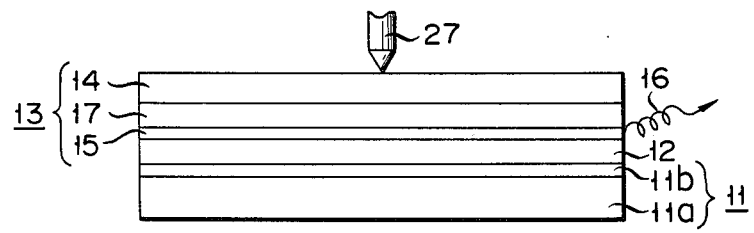
FIG. 3 is a side view showing another embodiment of the present invention.

FIG. 3 shows another embodiment of the coordinate input device shown in FIG. 2. In this embodiment, a hard synthetic resin plate 17 (having a thickness of approx. 25 microns) made of, for example, polyimide resin, glass epoxy resin, polyester resin, etc. is interposed between soft synthetic resin 14 and metallic layer 15. In this manner, the structure of surface electrode plate 13 can be made strong and the adherence of metallic layer 15 to resin can be improved.

Figure 4:
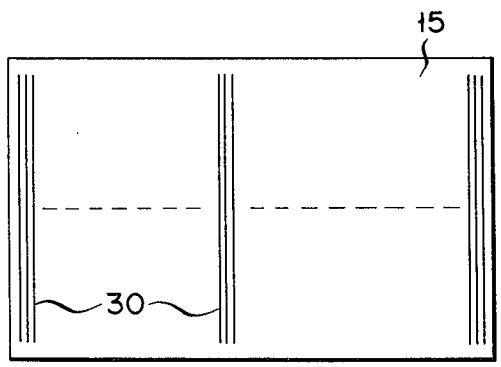
FIG. 4 shows a structure of surface electrode layer which may be used in the coordinate input device of the present invention.

As shown in FIG. 4, approx. 3 of slits 30 may be formed per 1 mm on the metallic layer, thereby increasing the flexibility of the metallic layer.

Obviously, numerous modifications and variations of the present invention are possible in light of the above teachings. It is therefore to be understood that within the scope of the appended claims, the invention may be practiced otherwise than as specifically described herein.

What we claim is:

1. A coordinate input device comprising:
    a resistance plate;
    a pressure-sensitive rubber sheet placed on said resistance plate; and
    a surface electrode plate having a soft synthetic resin plate;
    a hard resin plate having one surface placed on said soft synthetic resin plate; and
    said hard resin plate having another surface on which is formed a metallic electrode layer, said surface electrode plate being placed on said rubber sheet such that said metallic electrode layer contacts said pressure-sensitive rubber sheet.

2. A coordinate input device according to claim 1, wherein said resistance plate comprises an insulating substrate and a resistance layer formed on said substrate.

3. A coordinate input device according to claim 1, wherein said soft synthetic resin plate is formed of soft vinyl chloride resin.

4. A coordinate input device according to claim 1, wherein said soft synthetic resin is formed of polyurethane resin.

5. A coordinate input device according to claim 1, wherein said metallic electrode layer is formed of copper.

6. A coordinate input device according to claim 1, wherein said metallic electrode layer is formed of nickel.

7. A coordinate input device according to claim 1, wherein said metallic electrode layer is formed of tin.

8. A coordinate input device according to claim 1, wherein said metallic electrode layer has slits.

* * * * *